United States Patent [19]

Gut

[11] Patent Number: 5,471,459
[45] Date of Patent: Nov. 28, 1995

[54] METHOD AND APPARATUS FOR SUPERVISING ACCESS AND PROTECTING AGAINST UNAUTHORIZED ACCESS IN A COMMUNICATION METWORK

[76] Inventor: Max B. Gut, Ahornweg 15, CH-6353 Weggis, Switzerland

[21] Appl. No.: 60,749

[22] Filed: May 12, 1993

[30] Foreign Application Priority Data

May 15, 1992 [CH] Switzerland ............ 01560/92
Jun. 16, 1992 [CH] Switzerland ............ 01893/92

[51] Int. Cl.$^6$ ........................ H04L 9/32
[52] U.S. Cl. ........... 370/13; 370/94.1; 340/825.31; 340/825.34
[58] Field of Search ........... 370/13, 94.1, 110.1; 340/825.3, 825.31–825.35, 825.5, 825.51

[56] References Cited

U.S. PATENT DOCUMENTS

| | | | |
|---|---|---|---|
| 4,768,189 | 8/1988 | Gopinath et al. | 370/85.3 |
| 4,922,486 | 5/1990 | Lindinsky et al. | 340/825.34 X |
| 4,930,159 | 5/1990 | Kravitz et al. | 340/825.31 X |
| 4,961,224 | 10/1990 | Yung | 340/825.34 X |
| 5,124,984 | 6/1992 | Engel | 370/85.3 |
| 5,245,656 | 9/1993 | Loeb et al. | 340/825.31 X |
| 5,276,444 | 1/1994 | McNair | 340/825.31 X |

FOREIGN PATENT DOCUMENTS

0431751A1  6/1991  European Pat. Off. .

OTHER PUBLICATIONS

Elektronik, Bd. 38, Nr. 17, 18 Aug. 1989, Munchen DE, pp. 93–96, Kurt Schwaiger and Walter Weishaupt.
Elektronik, Bd. 38, Nr. 25, 08 Dec. 1989, Munchen DE, pp. 79–83, K. Etschberger et al.

*Primary Examiner*—Melvin Marcelo

[57] ABSTRACT

With this method protection against unauthorized access can be accomplished centrally so that less memory capacity and calculation time are needed for testing the right-of-access. By this the message traffic in the whole-network is constantly intercepted by a central supervision device (SV). A table is stored in the central supervision device (SV) whereby upon entry of a message, the central supervision device tests the right-of-access of the message sender (SE, PC) to the message receiver (AK) with the aid of data in the table and a predetermined portion of the information contained in the message. In case of unauthorized access, the supervision device causes the message to be rendered ineffective.

10 Claims, 6 Drawing Sheets

METHOD AND APPARATUS FOR SUPERVISING ACCESS AND PROTECTING AGAINST UNAUTHORIZED ACCESS IN A COMMUNICATION METWORK

BACKGROUND OF THE INVENTION

The invention concerns a method and apparatus for access-supervision and protection against unauthorized access in communication networks in which information in the form of a message can be transmitted over the network and a particular portion of the information contained in the message is employed for supervising the right of access to the receiver of the message.

Communication networks of this type also called "local area networks" (LAN) connect closely positioned, more or less intelligent electronic systems, so that communication of these systems with one another is made possible. For this purpose, information bits in serial format in the form of messages are transmitted over conductors of the network whereby information bits are sent out from one information source through conductors of the network to one or more information receivers, and by this means particular actions, also called "services", are triggered on the basis of the received information.

Depending upon the variables of the application purposed for the LAN, for example, the connection of computing systems and their peripheral devices (electronic data processing EDP) or the implemenation of process automation (control techniques), characteristic differences exist in regard to the network participants, the transmitted information as well as the protection against willful or unintentional misuse.

In the networks of the EDP's the network participants are computers, terminals, peripheral devices and so forth. The quantity of information transmitted over the network for each transmitted information packet is large, however seldom time critical. Protective measures provided should anticipate the willful misuse of the transmitted information and should prevent the impermissible utilization of services and functions by unauthorized participants. On account of active and foreseeable attempts of misuse a "basis of mistrust" must be the foundation for a suitable (strong) protective system. The required protective measures are therefore comprehensive and expensive. In LAN's for EDP adequate resources are usually available in the network participants in order to achieve these additional objectives reasonably and also timely.

In other networks, which serve the above-referenced control technique, the network participants are sensors, actuators and control systems. The information transmitted over the network consists mostly of short messages with limited diversity of information which is, however, potentially time-critical. Protective measures are seldom implemented. They serve above all as protection against unintentional erroneous processing and to a lesser extent protection against willful misuse of the transmitted information or the available services and functions. Protection against such misuse therefore can be rather weak, founded on a "basis for trust", and can be easily installed. Known protective mechanisms, in the simplest embodiment, examine the authority of a particular bus-participant of addressing another particular bus-participant (access control), as well as the authority of the addressing participant to trigger a particular action at the receiver. The individual network participants, however, often do not have sufficient resources to guarantee total protection comprehensively and timely.

As a result of increased coupling of networks for control technology with the above-referenced EDP-oriented networks by means of any type of bus-coupling, or due to more universal service units and complex networks, there is an increased risk of unintentional or unforeseeable command executions with directly traceable damages. On account of this, there is also a growing demand for protective measures with networks for control technology.

In one known method ("Profibus", DIN 19245) a portion of the information contained in the transmitted message and additional information stored with (at) the bus-participant are employed for the purpose of verifying or supervising the right-of-access. Here the sender, the addressee, as well as the action to be accomplished are extracted from the message. The information stored at each bus-participant for the purpose of protecting against unauthorized access is a table in which the right of access is defined with respect to each possible participant or each possible required action. With the aid of data contained in the table such as passwords, access groups, rights of access and indexes, access authorization of a bus-participant for the execution of a desired action can be determined upon arrival or receipt of a message. The result of an examination of this table is either the authorization of access or the denial of access whereby the execution of the desired action or the retraction of the command for action is triggered respectively.

With this known method, it is considered to be disadvantageous that the information necessary for supervision but not contained in the message must be stored with each addressee which requires memory space and calculating time for the operation. Furthermore with regard to information consistency, the content and place or division of the information for the access authorization in the various tables and their partial duplication can lead to difficulties. Besides, with simple bus-participants having very little memory capacity available, even a simple password protection or supervision for the right of access can scarcely be realized with the above mention method.

In addition to the aforementioned method ("Profibus") there exists on the other hand for the exclusive security of correct data transmission a plurality of methods to make transmission errors recognizable with the aid of redundancy additionally built into the message. Recognized errors can thereby be employed solely for error indication in the simplest case, but also for error correction. While in the simplest case each receiver accomplishes the error supervision itself, a so-called instrumentation bus ("I-Bus") has been proposed also (ELECTRONIK, Vol. 38, No. 17, 18 August, 1989, Munich, pp. 93–96; K. Schwaiger et al.: Die Vielfalt der Daten bündeln).

With the "I-Bus" an additional increase in the data transmission reliability is intended with data transmission between components within a motor vehicle. To this end, also other bus-participants examine messages, which are not addressed to them, with the aid of parity bits and check-sum bytes for correct transmission; a message recognized as being erroneous is generally declared to be invalid by means of an interrupt signal. With an I-bus however the problem of monitoring the right of access is neither addressed nor solved.

SUMMARY OF THE INVENTION

It is an object of the present invention to provide a method of the above-mentioned type as well as an apparatus for accomplishing the method. With the invention, the bus-participants are not required to have any additional storage capacity or calculating time for the supervision of access.

This object is achieved through the invention described in patent claims 1 and 18. Here, the communication traffic in the entire network is always intercepted by means of one central monitoring apparatus. In the central monitoring apparatus a table is stored whereby upon entry of a message the central monitoring apparatus examines the right-of-access of the sender of the message to the message receiver with the aid of data in the table and of a particular portion of the information contained in the message. In the case of an improper access the apparatus renders the message ineffective.

The advantages achieved by the invention lie particularly in that the protection against unauthorized access can be accomplished centrally and, with that, only one table is required for the whole system. As a consequence, practically no additional memory space is required at the communication participants, and during the testing for access other operations can be accomplished. A further advantage is enjoyed in that a stipulated, fixed waiting time can be provided in the system.

The invention is more particularly described below with the aid of exemplary embodiments in combination with the drawings.

BRIEF DESCRIPTION OF THE DRAWINGS

FIG. 3a is a character definition, FIG. 3b is a message definition and FIG. 3c is a message field definition for a first embodiment and FIG. 3d is a message field definition with associated character definition of an access field for one variation of the method.

DESCRIPTION OF THE PREFERRED EMBODIMENTS

Figure 1:
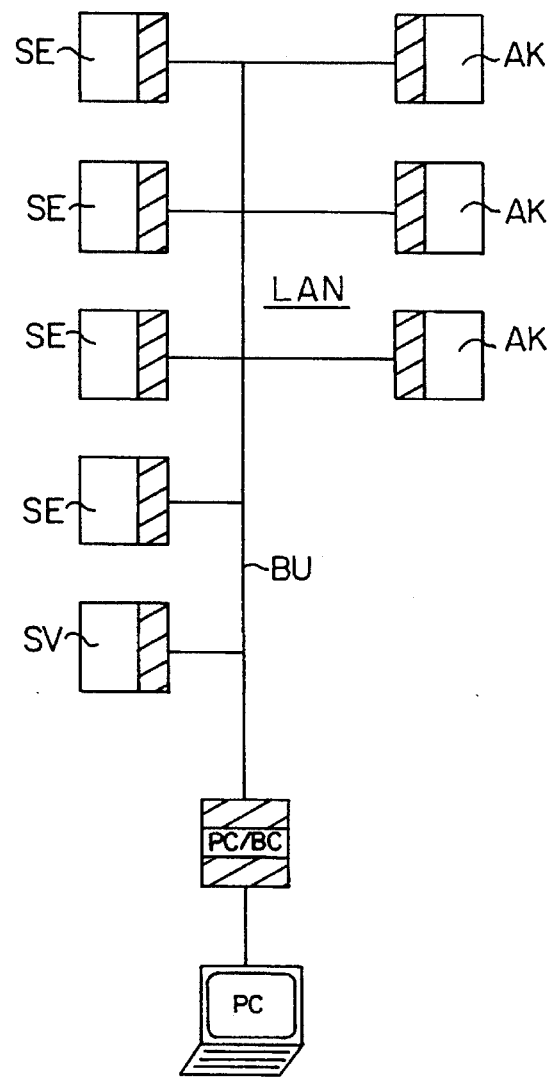
FIG. 1 is a block diagram of the structure of one communication network for control technology.

FIG. 1 illustrates sensors SE and actuators AK which for example can be intelligent electronic systems. Sensors SE and actuators AK are connected with one another over a bus BU of a LAN network over which information bits of messages are transmitted in serial format. Since in the selected example the messages are sent from the sensors SE and are received by the actuators AK, the terms "message sender" and "message receiver" will be employed below. One central monitoring apparatus SV, also called the "super-visor", always intercepts the communication traffic in the whole LAN network and is connected with the bus BU. In supervisor SV data is stored in the form of a table by which the supervisor SV can supervise the access authorization of a message sender to a message receiver by applying a portion of the message that is sent. A universal service device designated PC is in communication with the bus BU through a bus coupler PC/BC and is able to feed each type of information into the LAN network and also to receive it therefrom.

Figure 2:
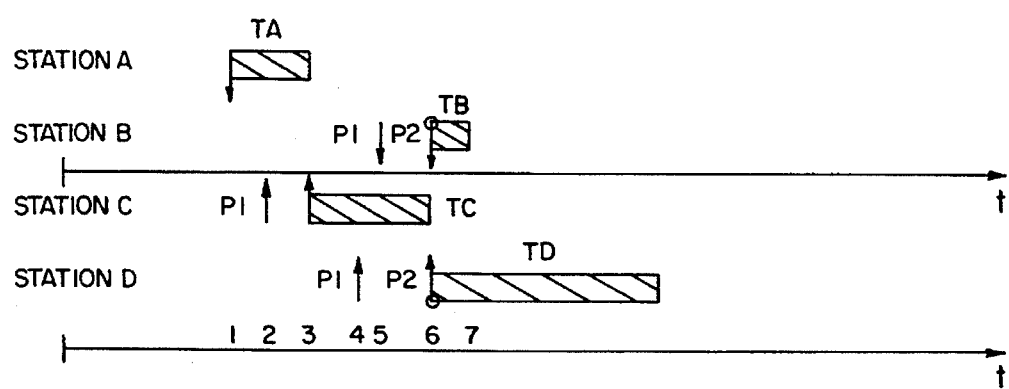
FIG. 2 is a timing diagram of the access points for a plurality of stations on the bus of the communication network.

According to FIG. 2 messages designated TA,TB,TC and TD are sent out from the stations A,B,C, and D. The arrows P1 symbolize the intent to gain access while the arrows P2 symbolize possible collisions. The illustrated access situation has as its basis for example a bus protocol CSMA/CA (Carrier sense multiple access, collision avoidance). This protocol guarantees that messages (telegrams) can be transmitted only in succession, that is without overlaps and mutual interference.

Figure 3A:
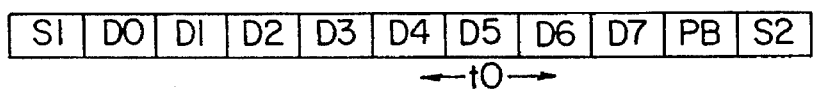
FIGS. 3a–3d graphically illustrate the definitions of information transfer, namely

In FIG. 3a, as is known, a start bit is S1, eight data bits are D0–D7, a parity bit is PB and a stop bit is S2. In the following explanation a transfer rate of 9600 baud and bit period of $t0=104$ µs is assumed.

Figure 3B:
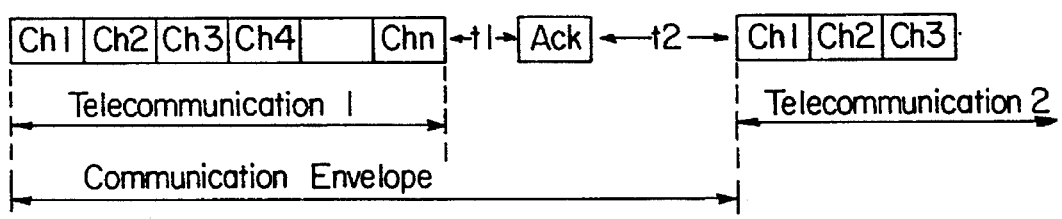

In FIG. 3b, Ch1–Chn represent the characters given for example in FIG. 3a, Ack represents the message acknowledgement (8 bit), t1 represents the minimal time between the end of one message 1 and the acknowledgement Ack, and t2 the minimal time between the message acknowledgement Ack and the next message 2. Here, for example, t1 is fixed at 200 µs and t2 at 5 ms. It is to be understood that message 1 is a command message for a requested action and message 2 is a cancelling message in case of unauthorized access.

Figure 3C:
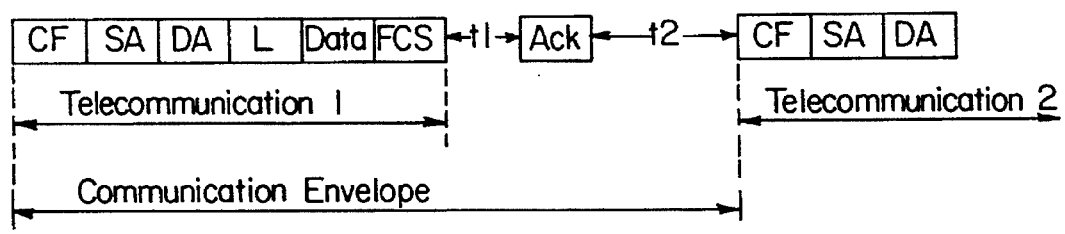

According to the field definition of FIG. 3c a control field (8 bit) is designated with CF, a sender address (16 bit) with SA, the receiver address (16 bit) by DA, the length (8 bit) by L, the data field (8 bit) with Data and the test byte (8 bit) by FCS.

The above described installation according to FIG. 1 operates with a bus access according to FIG. 2 as follows (based upon the characteristic properties for LAN's with a bus structure such that all bus participants are always able to intercept all of the information transmitted on the bus):

Station A, intending to transmit a telegram message TA, first of all listens in on the bus BU and determines whether the bus is already busy with another transmission (timing point 1). Having established that the bus is free, the station sends its telegram TA. If another station (Station C) intends to likewise transmit a telegram TC during this period, it determines that the bus BU is busy (timing point 2). Hence, the station holds up the transmission until the bus is again free (timing point 3).

Now when more stations (D and B) themselves intend to transmit telegrams TD, TB during the transmission of a telegram TC by another station (C) (timing points 4,5), then their attempt to access becomes quasi-synchronized by the release of the bus BU (timing point 6): both stations do not "hear" anything on the bus anymore and therefore start immediately to send their telegrams TD, TB (timing point 6). While sending out the telegrams TD, TB however, both stations listen in to determine if the information which they have sent out corresponds with the information that they hear. As soon as the information heard no longer corresponds with the information sent, they immediately terminate the transmission and attempt to gain new access only if the bus is again free (timing point 7, Station B).

If it is guaranteed through the network that a plurality of stations can simultaneously transmit without interference (for example "wired or"—connections), then the one station (Station D, timing point 7) is not able to establish that other stations (Station B, timing period 6–7) have transmitted simultaneously (however the same). It will just continue with the transmission without prejudice. In this case station D actually had the higher priority relative to the station B. If the sender's address is sent out as the first part of the message, the priority can be divided out on the basis of the bus participant's address and be determined.

Starting from the definitions according to FIGS. 3a–3c, the supervision of the access authority by means of the central monitoring apparatus SV is described below with the aid of the timing diagrams FIGS. 4a and 4b and the flow chart FIG. 5a, 5b and with the assumption, for example, that the universal service device PC sends a message (telegram) which should initiate an action.

The service device PC sends a switching command in the form of a message and then waits for its acknowledgement (timing point 1, period 2). The bus coupler PC/BC receives the message at timing point 3, translates it during period 4 into a form suitable for transmission in the LAN network and feeds it into the network at timing point 5. During the period 6 the bus coupler PC/BC waits for an acknowledgement or a cancellation message. At the timing points 7,8 the addressed actuator AK and the supervisor SV receive the message whereby the actuator AK during the period 9 waits for the cancellation message, and the supervisor SV tests for the right-of-access during period 10. Since the supervisor SV intercepts all of the messages that are sent out, it already can begin with the testing for the right-of-access during the message transmission with the aid of the transmitted address and the required functions as well as the table stored within the supervisor. Thus, at the end of a telegram packet (FIG. 3b, 3c) the authority for access has already been established. Here the supervisor SV has all of the necessary information at its disposal at latest at the beginning of the test byte FCS (FIG. 3c) and can begin the testing at this timing point. According to the definitions of FIGS. 3a–3c the supervisor SV then can at the earliest after a time:

tx=1 character+t1+1 character+t2, that is,

11·104 µs+200 µs+11·104 µs+5 ms=7'488 µs send a cancellation message. The supervisor SV has this time at its disposal for the tests. For example, it works with an instruction cycle of 1 µs so that it can process in this time approximately 7400 instructions.

Figure 4A:
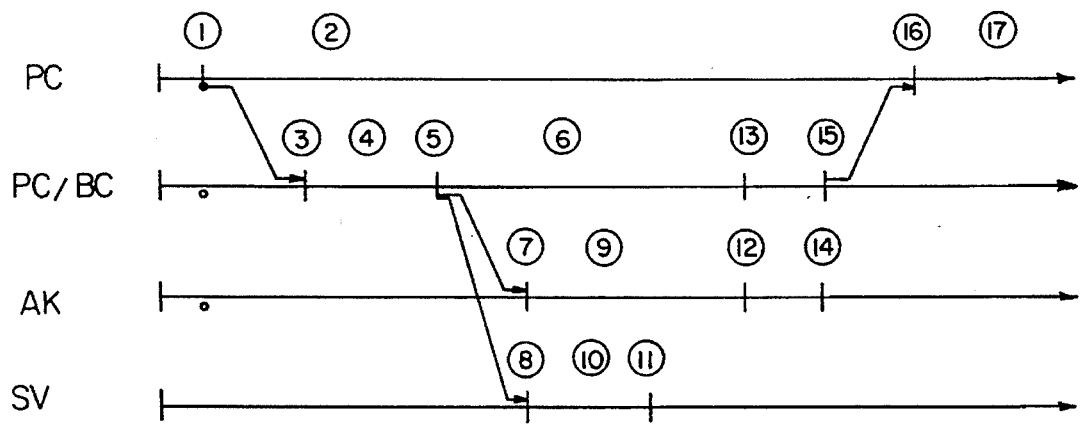
FIG. 4a is a timing diagram for an allowed access.
Figure 4B:
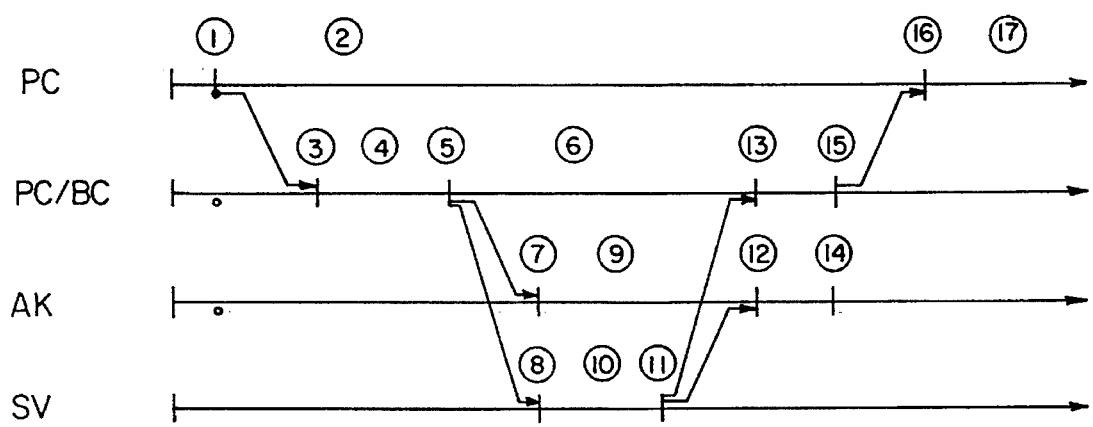
FIG. 4b is a timing diagram for an unallowed access at the bus of a communication network according to the first embodiment.
Figure 5A:
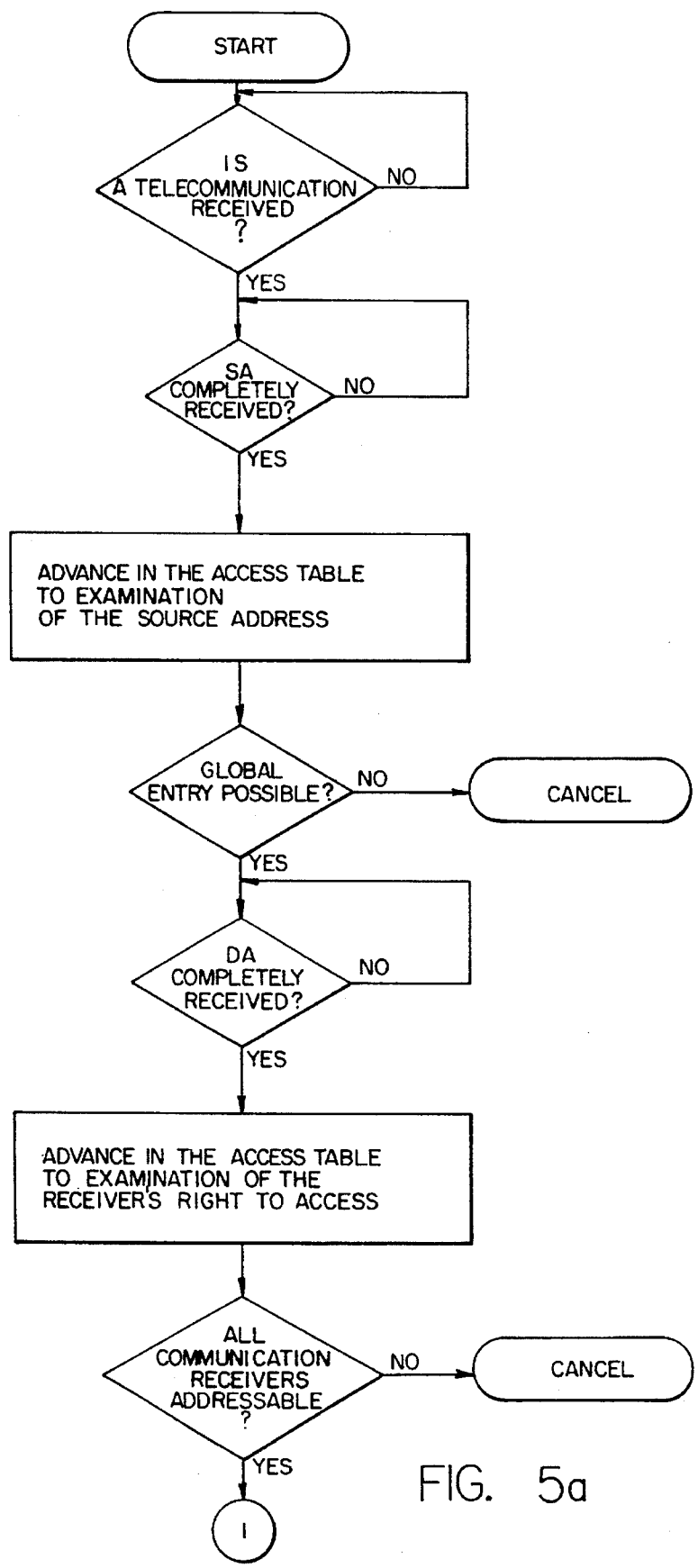
FIGS. 5a and 5b are flow charts of the monitoring processes with the supervision of the access authorization for the examples according to FIGS. 4a and 4b.
Figure 5B:
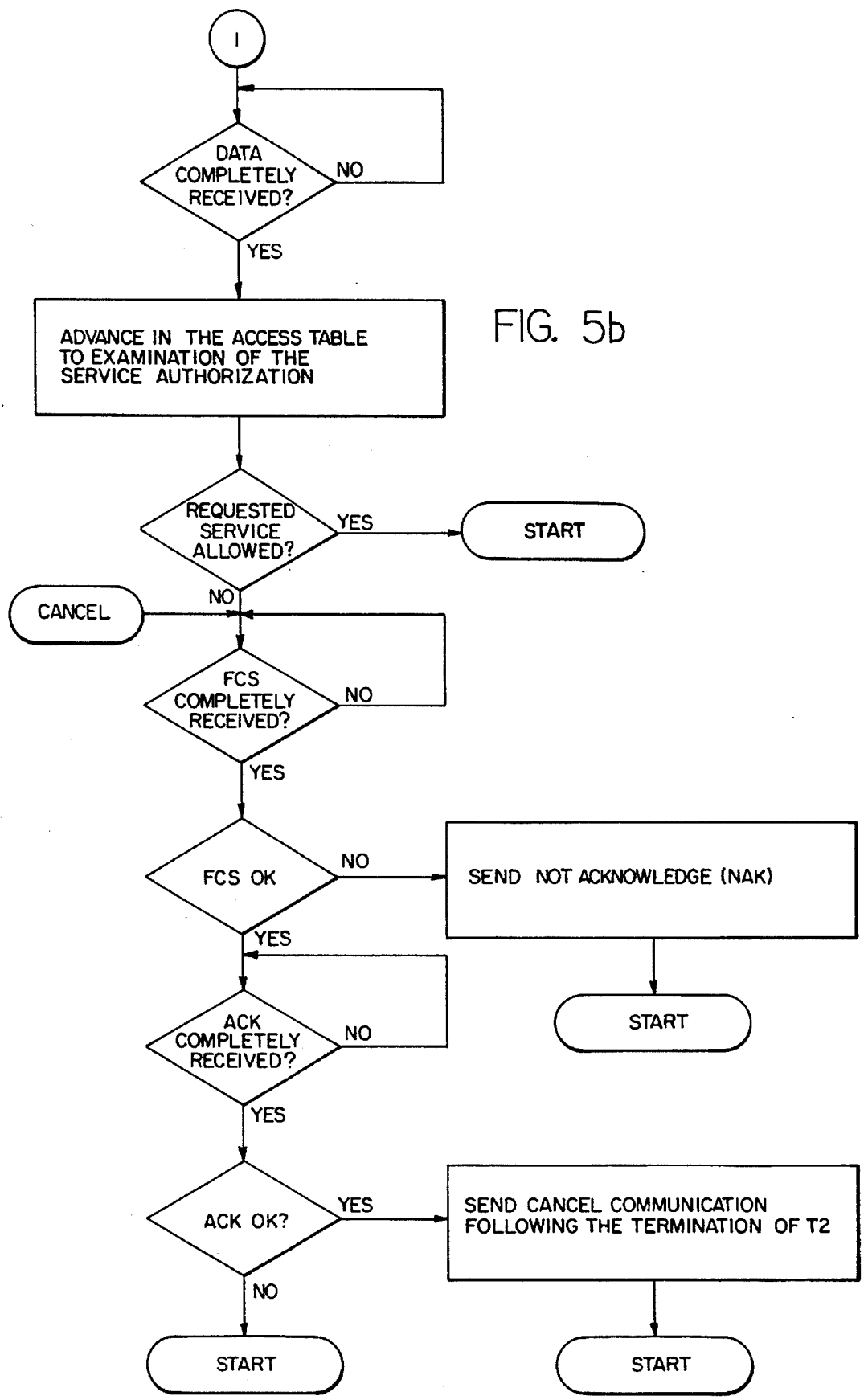

Now let it be assumed that the testing confirms the right-of-access (timing point 11, FIG. 4a). At this timing point then the supervisor SV does not send a cancellation message so that at timing point 14 (after waiting for the missing cancellation message) the actuator AK executes the command transmitted by the command message. At timing point 15 the bus coupler PC/BC sends an acknowledgment message to the service device PC that receives this communication at timing point 16 and displays a corresponding answer on a display during the period 17.

If, however, supervisor SV by this testing establishes for that the access is not authorized, then it sends at timing point 11 (FIG. 4b) a cancellation message that is received at timing point 12 by the actuator AK which thereupon cancels the command execution. At timing point 13 bus coupler PC/BC also receives the cancellation message and as a result sends a password-error message to the service device PC at timing point 15. The service device PC receives the error message at timing point 16 and produces the corresponding answer on the display during the period 17.

In order to save time for the examination of the access authority, the table stored in the supervisor SV is preferably organized in the same sequence as that in the message field (FIG. 3c). According to FIGS. 5a and 5b, with the aid of which supervision during the time period 10 (FIG. 4a and 4b) is illustrated in more detail, the supervisor SV can already examine the global access authority by the time the sender's address SA is received. With the subsequent receipt of the receiver's address DA, the receiver-access authority and correspondingly, after receipt of the data field data, the requested action can be supervised. With an erroneous test byte FCS the supervisor SV sends a "not acknowledge" (NAK) as a message confirmation, and with that initiates repetition of the message. In this situation the supervisor will not send out a cancellation message even with the false access attempt. However if it receives a "NAK" on a tested message, then here it will also wait for repetition of the message and not send a cancellation message.

Since a message receiver must wait following the transmission of a message confirmation Ack at least the duration of one whole message packet until he can begin with a command execution, it is advantageous to keep the cancellation message as short as possible. That can be achieved in that apart from the control field CF and the test byte FCS no further information is transmitted.

Figure 6:
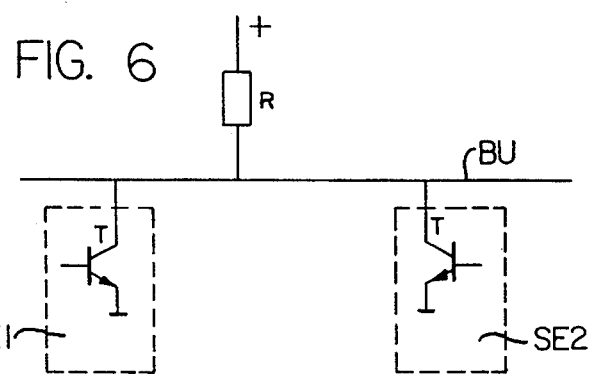
FIG. 6 is a simplified schematic for explaining the "wired or"—connection over a bus.

If the supervisor SV is still faster and can definitely establish the access authorization before the end of the message to be tested, then it can itself, upon an inadmissible access attempt, influence or render ineffective the message tested, by means of the above described CSMA/CA-Protocol (in the network a plurality of stations can send without interference). One such variation of the method is described below first with the aid of FIGS. 6, 7a and 7b.

For this purpose the supervisor makes use of the "wired or"—connection and influences one or more bits which are capable of being influenced. This is further explained with the aid of FIG. 6.

When a logical 0 is to be transmitted on the bus, a transistor T connected with the bus BU is switched into the conductive state in the corresponding station. On the other hand if a logical 1 is to be transmitted, none of the transistors T may be in the conductive state. If two bus participants SE 1, SE 2 would simultaneously transmit the same information, then this information appears on the bus unadulterated, although both bus participants accurately transmit "their" information (however the same). However if the bus participants do not send the same information, then in this circumstance the logical 0 of the one bus participant dominates the logical 1 of the other bus participant. Accordingly, a logical zero and not a logical 1 appears on the bus, that is, the bus participant with the logical 0 "overwrites" the logical 1 of the other bus participant.

Figure 7A:
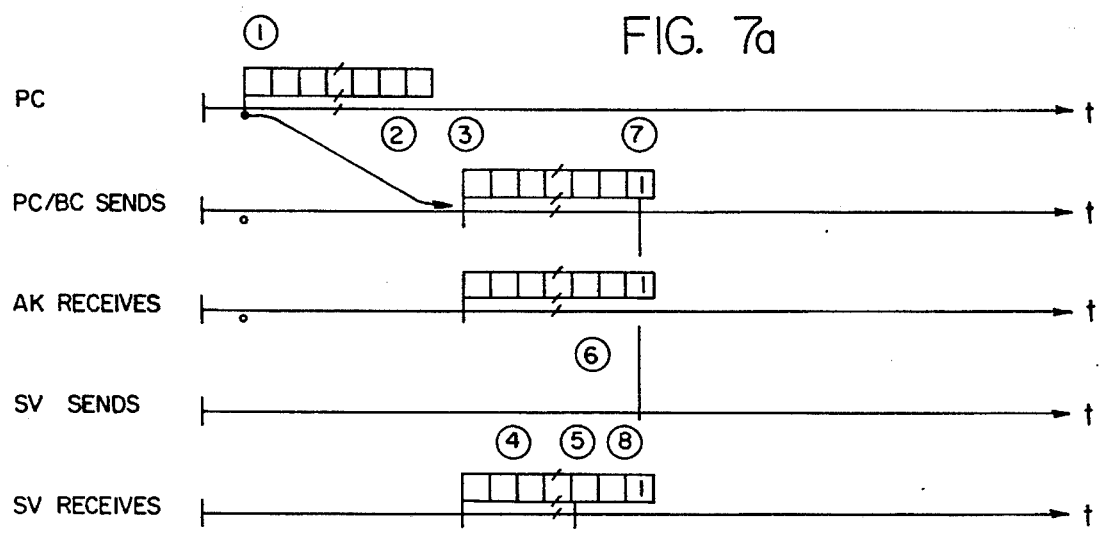
FIGS. 7a and 7b are timing diagrams similar to FIGS. 4a and 4b of an allowed and unallowed access respectively in a variation of the method in combination with the definitions of FIG. 3d.
Figure 7B:
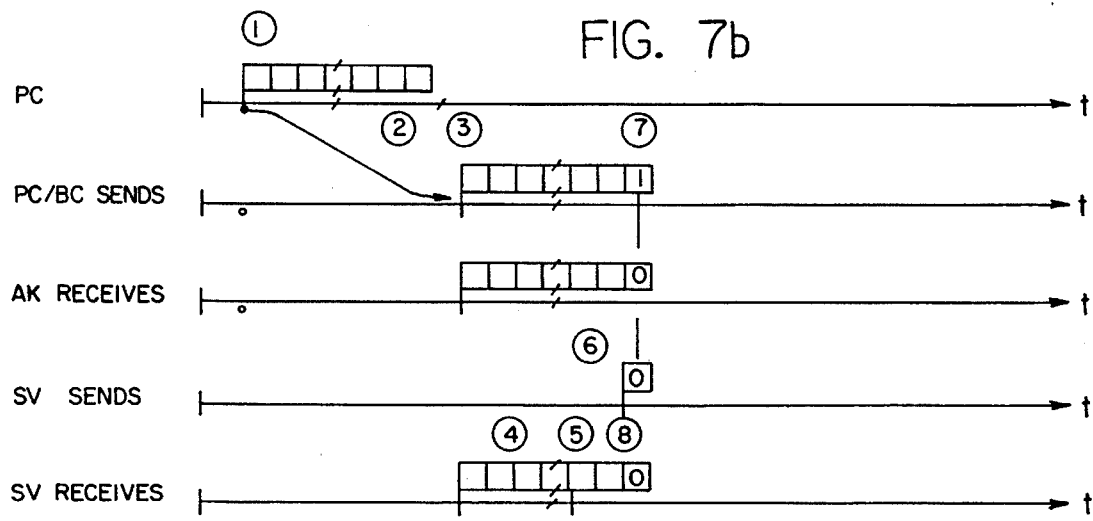

This effect can be used to influence or "falsify" a message during transmission by the supervisor SV (FIG. 7a and 7b). The supervisor, in case of unallowed access, writes a logical 0 in a bit cell of the message to be examined, the contents of which cells according to definition, must be a logical 1 (for example the stop bit of a character).

The message receiver checks the transmission for example with the aid of the parity bit PB or of a test byte (Framing Check FCS) and establishes an apparent transmission error due to the intervention by the supervisor. It answers on that account with a "not acknowledged", whereupon the message sender repeats the message. The supervisor will also then again falsify this message whereupon the message receiver likewise sends back a further "not acknowledged". After a known and predetermined number of message repetitions, the message sender ceases the attempts to transmit and produces an error signal. With this the unallowed access is successfully thwarted.

In contrast to sending out a cancellation message as in the previous example, there is no need, in the present case, for implementing an additional algorithm for processing the cancellation message in any of the message receivers. A correctly received message can immediately be executed. On the other hand the additional bus loading which arises from the message repetition can be disadvantageous.

If however, a special field in the message definition is reserved for protection against unauthorized access, then the bus participant can in each case accomplish an examination of said field, and in the case of an error can discriminate between a transmission or framing error on the one hand and an access error on the other hand so that a repetition of the message can be avoided. This will be illustrated below with the aid of an example according to FIG. 3d.

Figure 3D:
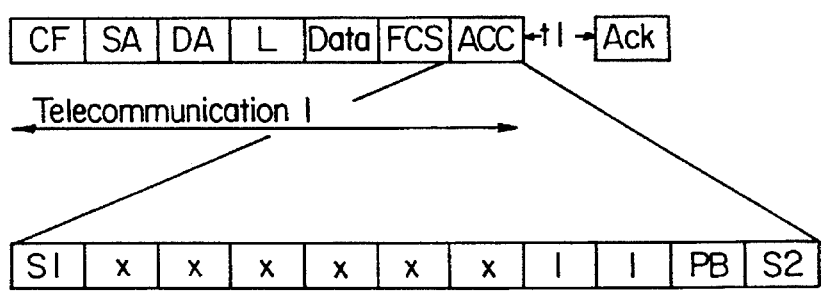

The message according to FIG. 3c is supplemented in a manner corresponding to FIG. 3d with an access field ACC. In this field two bit-positions, each of which precedes the parity bit PB in this example—are defined as a logical 1. The supervisor can now set, in case of an established access error, the two bits from logical 1 to a logical 0 on the basis of the "wired or" connection according to FIG. 6, whereby the parity bit upon examination in the receiver appears correct and no framing error is established. The message receiver however examines the two mentioned bit positions also and recognizes, in case they are both set at a logical 0, an access violation. Accordingly it refrains from executing the command.

The meaning of the events designated with numerals in the timing diagrams of FIGS. 7a and 7b is as follows (see also FIG. 1):

(1) Message (Tg) is sent from PC to PC/BC
(2) PC/BC converts Tg and prepares it for transmission over the bus
(3) PC/BC transmits the converted Tg over the bus
(4) SV examines the right of access during reception
(5) The authority for access is now known
(6) SV waits for the location in the Tg, where Tg can be affected (overwritten)
(7) At this position Tg has a bit that is capable of being overwritten
(8) With unallowed access the supervisor SV writes over this bit.

To prevent global access in case of a defective supervisor SV, the supervisor SV can periodically send out a signal to all message participants whereby they confirm that the supervisor and with it the access supervision is functioning in an orderly manner. The absence of the referenced signal during more than one period triggers an error or alarm signal.

An additional protection against unallowed access can be achieved by having each participant compare the sender's address SA with its own address in each message transmitted on the bus and not originating from itself. If correspondence is established, then the participant sends out for example a cancellation message; in order to render ineffective corresponding messages having identical addresses, essentially the same possibilities exist on the part of the bus participants as described above in connection with the supervisor SV. By this, one can avoid having a bus participant use without authority as its sending address SA the address of another bus participant for which the intended access would be valid. Further, if each participant or its address is listed at least once in the access table of the central supervision device SV, then the supervisor SV can also send out a cancellation message if the sender's address SA in a transmitted message does not correspond to a recorded "legal" participant. These measures completely guarantee in a simple manner that only messages originating from "legal" bus participants, entered in the list with their own sender's address, can be successfully transmitted (authenticity control).

I claim:

1. A method for supervising access and protecting against unauthorized access in message networks whereby information in the form of messages is transmitted over a network having a plurality of stations and a central supervision device configured to receive each of the messages transmitted on the network and a particular portion of the information contained in the message is employed for supervising the right-of-access at the message receiver, said method comprising the steps of:

generating, at a first station, a message destined for a second station, said first station message including signals indicating a right of access of said first station with other stations in the network;

transmitting said first station message over the network;

intercepting said transmitted first station message at said central supervision device;

comparing said transmitted first station message right of access signals with supervisory signals stored in a table in said central supervision device indicative of authorized access to said second station;

generating cancellation signals if said comparison indicates that access to said second station is unauthorized;

transmitting said cancellation signals to said second station;

halting execution of said transmitted first station message by said second station upon receipt of said cancellation signals; and beginning the comparison of the right-of-access by means of the central supervision device (SV) during the transmission of a message and terminating said comparison before the end of the message, and in the case of an unauthorized access the central supervision device (SV) editing a portion of said transmitted message to guarantee its non-effectiveness.

2. A method according to claim 1 further comprising the steps of generating, by the central supervision device, an error signal in the transmitted message in order to trigger its repetition.

3. The method according to claim 1 further comprising the steps of modifying, by the central supervision device, a predetermined portion of the information signals in said transmitted message, whereby the recognition of the modification in the second station renders the message ineffective.

4. A method according to claim 1 characterized in that each of said stations and said central supervision device compares an address (SA) of the transmitted message and upon detection of an address identical with its own address, causes the message to be rendered ineffective.

5. A method according to claim 4 further comprises the steps of waiting, by a receiving station, a particular predetermined period of time for execution of an action demanded by the message;

accomplishing the comparison of addresses during said predetermined time, and sending after the communication participant having established an address identity a canceling message whereupon the message receiving station does not accomplish the requested action.

6. A method according to claim 5 wherein said address comparison step begins during the message transmission.

7. A method according to claim 6 wherein the message has a control field (CF), the sender's address (SA), the receiver's address (DA), a length (L), a data field (D) and a test byte (FCS), wherein said address comparison step begins during or immediately after receipt of a sending station address (SA).

8. A method according to claim 4 wherein said address comparison step begins during the message transmission and is terminated before the end of the message, and wherein the receiving station, having established an address identity edits the transmitted message to guarantee its ineffectiveness should a received address be the same as the receiving station's address.

9. A method according to claim 8 further comprising the steps of generating an error in the transmitted message in order to trigger a repetition of the transmitted message.

10. A method according to claim 8 further comprising the step of modifying a portion of the information signals included in said message, whereby recognition of the modified message signals renders the message ineffective in the message receiver.

* * * * *

UNITED STATES PATENT AND TRADEMARK OFFICE
CERTIFICATE OF CORRECTION

PATENT NO. : 5,471,459
DATED : November 28, 1995
INVENTOR(S) : Max B. Gut

It is certified that error appears in the above-indentified patent and that said Letters Patent is hereby corrected as shown below:

Cover Page

Item [54], line 4, and col. 1, line 4, delete "METWORK" and substitute --NETWORK--.

Signed and Sealed this

Twenty-sixth Day of March, 1996

Attest:

BRUCE LEHMAN

*Attesting Officer*      *Commissioner of Patents and Trademarks*